United States Patent [19]
Saito

[11] Patent Number: 5,898,137
[45] Date of Patent: *Apr. 27, 1999

[54] SPEAKER SYSTEM FOR TELEVISION SET

[75] Inventor: Hitoshi Saito, Saitama-ken, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/596,585

[22] Filed: Feb. 5, 1996

[30] Foreign Application Priority Data

Feb. 6, 1995 [JP] Japan ................................. 7-018179

[51] Int. Cl.$^6$ ............................ H05K 5/00; G10K 11/00
[52] U.S. Cl. ...................... 181/144; 181/155; 181/191; 381/24; 381/90
[58] Field of Search ............................ 181/144, 145, 181/148, 155, 156, 191, 198, 199, 141; 381/24, 88, 90, 188, 205

[56] References Cited

U.S. PATENT DOCUMENTS

| 4,646,349 | 2/1987 | Puls | 381/24 |
| 5,027,403 | 6/1991 | Short et al. | 381/24 |
| 5,036,946 | 8/1991 | Yoshino | 181/156 |
| 5,274,709 | 12/1993 | Koizumi | 381/24 |

FOREIGN PATENT DOCUMENTS

| 0462571 | 12/1991 | European Pat. Off. . |
| 0492919 | 7/1992 | European Pat. Off. . |
| 6-197293 | 7/1994 | Japan . |
| 6-284488 | 10/1994 | Japan . |

*Primary Examiner*—Eddie C. Lee
*Attorney, Agent, or Firm*—Pillsbury Madison & Sutro LLP

[57] ABSTRACT

A sound A is emitted from respective left- and right-hand front speakers which are provided on a television set, in a front direction, while, regarding respective side speakers which are provided respectively on left- and right-hand sides of the television set, reflectors each having substantially a semi-conical shape are provided so as to face to a forward direction of one-side faces of respective speaker diaphragms, to radiate sounds B due to the side speakers, in the front direction. In other words, in addition to the sound A in the front direction which are emitted from the left- and right-hand front speakers, the sounds B due to said side speaker are radiated in the front direction at positions at which a sound radiated position is different in vertical direction, and in backward and forward direction from this sound A. Moreover, the arrangement is such that a radiated sound C from the other side faces of the respective speaker diaphragms of the left- and right-hand side speakers to which said reflector does not face is radiated to left- and right-hand outward faces of the television set as it is. Thus, it is possible to improve separation performance of the left- and right-hand sounds, and it is possible to generate sounds having a cubic sound feeling, an expanding feeling and a stereophonic feeling.

4 Claims, 11 Drawing Sheets

SPEAKER SYSTEM FOR TELEVISION SET

BACKGROUND OF THE INVENTION

1. Field of the Invention

The invention relates to speaker systems for television sets and, particularly, to a speaker system for a producing sound superior in stereoscopic or stereophonic separation and which provides a feeling of three-dimensional sound production.

2. Description of the Related Art

Over recent years, most television sets include stereophonic audio systems that enhance sound quality in right- and left-hand separation.

Generally, however, because cathode ray tubes require much of the television set's installation space, many television sets location speakers on both sides of an image plane of the cathode ray tube, or on both sides at an upper part or a lower part thereof. For this reason, a distance between a left- and right-hand speakers is short limited by the installation space constraints described above. Consequently right- and left-hand stereophonic separation is remarkably deteriorated. Especially acoustic system or the like.

Figure 11A:
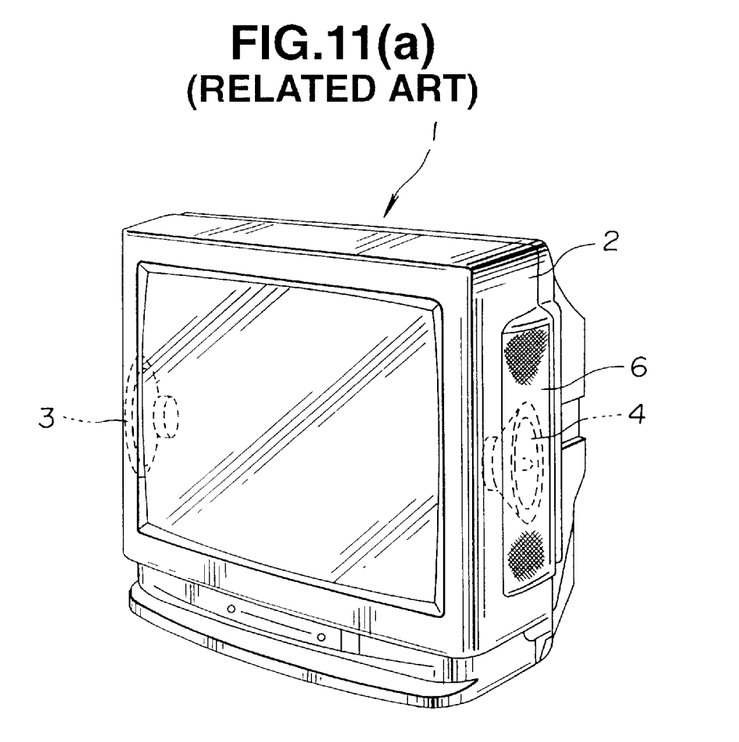
FIG. 11(a) is a perspective view showing a conventional speaker system for a television set.
Figure 11B:
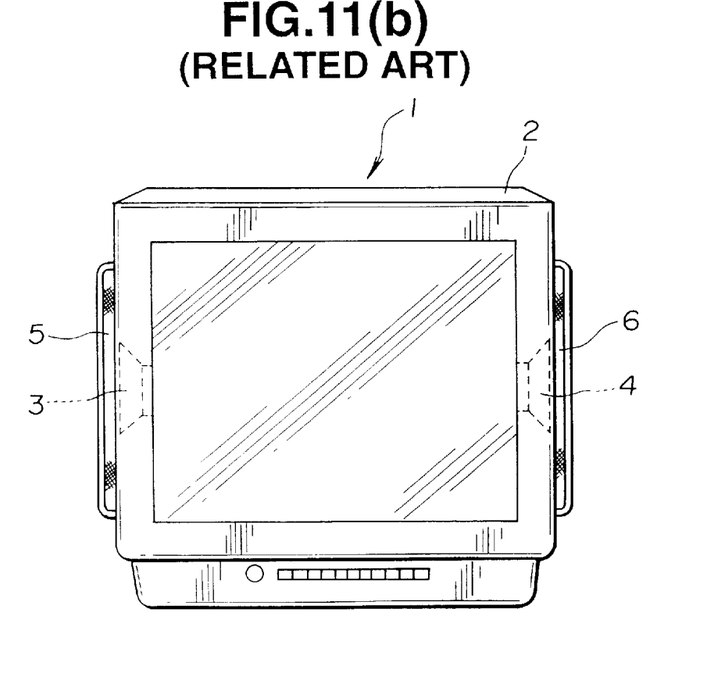
FIG. 11(b) is a front elevational view of FIG. 11(a)

In order to improve the right- and left-hand separation performance, speakers have been arranged on both sides of a cabinet 2 of conventional television set as shown in FIGS. 11(a) and 11(b). FIG. 11(a) is a perspective view, and FIG. 11(b) is a front elevational view thereof. Nets 5 and 6 are arranged respectively on cabinet sides which are opposed against respectively forward faces of left- and right-hand speakers 3 and 4.

The television set shown in FIGS. 11(a) and 11(b) improves the left- and sound expanding feelings; however where the sound is heard from the front of the television set, the sound is not direct and therefore has reduced sound quality. Moreover, in a case where the sound is heard at a location which approaches either of the left or right from the front, a person who hears the sound at the left hears only the left-hand sound. Furthermore, a person who hears the sound at the right hears only the right-hand sound. Accordingly, the left- and right-hand audio signals cannot be heard as stereophonic sound.

Figure 12:
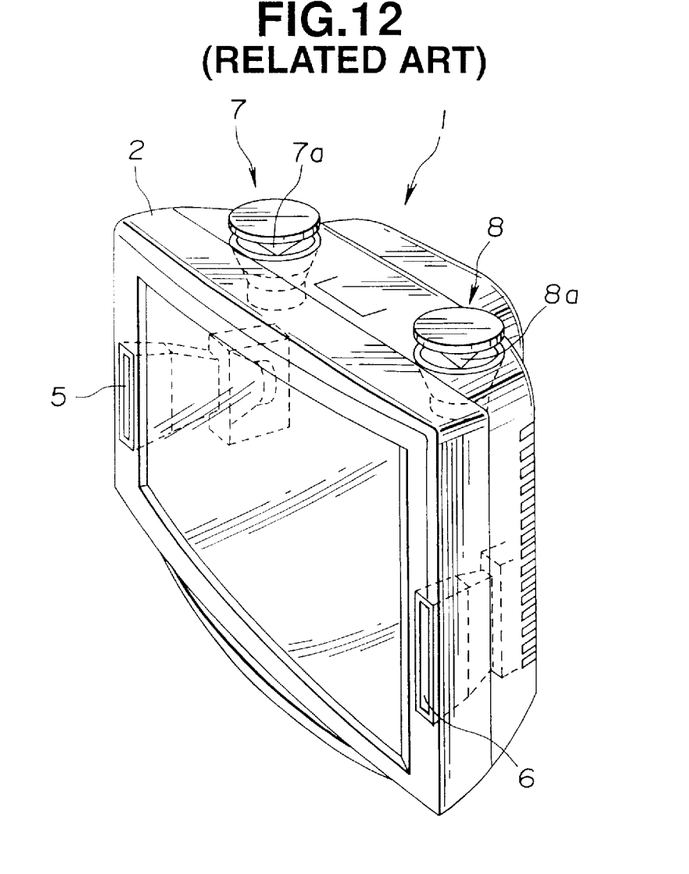
FIG. 12 is a perspective view showing the other conventional speaker system for a television set.

As the size the television set's increases, various improvements to stereophonic sound reproduction made FIG. 12 shows such a speaker system for a television set. The present system has been described in the specification of Patent Application No. HEI 5-70169 (70169/1993) (Patent Unexamined Publication No. HEI 6-284486 (284488/1994)) which the present applicant has filed for patent to Japanese Patent Office on Mar. 29, 1993.

In FIG. 12, the front speaker units 5 and 6 for radiating sound to a front direction of the television set 1 are arranged on the right and on the left of the front, and reflection-type speakers 7 and 8 for emphasizing directionality, which respectively have directionality reflectors 7a and 8a for radiating the sound forwardly obliquely of the television set 1 are arranged respectively on the left and right of an upper face of the television set 1. This enables stereophonic sound-field reproduction to be executed as compared with an arrangement in which only the front speaker units 5 and 6 are established. Thus, sound quality and performance are considerably improved.

However, in the case of the system illustrated in FIG. 12, in order to radiate the sound obliquely forwardly of the television set 1, it is necessary to design such that sound radiating mouths of the respective reflection-type speakers 7 and 8 which are arranged respectively on the left and the right of the upper face are located or positioned at a location upper higher than an upper surface of the front cabinet of the cabinet 2. Thus, the design prevented placing devices such as VCRs; on the top of the television set.

As described above, the prior art has had the following problems. That is, it is difficult for the system shown in FIGS. 11(a) and 11(b) that the stereophonic audio is heard as a reproduced sound, depending upon a hearing position. Alternatively, the system shown in FIG. 12 is a system which is superior both in sound quality and performance. However, the prior-art system cannot necessarily be said as being a system which is preferable in outer appearance.

SUMMARY OF THE INVENTION

An object of the present invention is to provide a speaker system for a television set, which is superior in left- and right-hand separation characteristics and left- and right-hand movement feelings and which can reproduce a sound having a stereophonic feeling.

Another object of the invention is to provide a speaker system for a television set, which provides, a good appearance.

According to a first invention, there is provided a speaker system for a television set, which is characterized by comprising:

a first speaker arranged within the television set;

an acoustic waveguide for guiding sound from the first speaker, to a front direction of said television set and a second speaker provided with a conical reflector arranged on a side of the television set and at a position where a sound radiated position is different in height and depth from the first speaker, for radiating and diffusing the sound to the front direction from the television set.

According to a second invention, there is provided a speaker system for a television set, which is characterized by comprising:

a first speaker provided on a front face of the television set, for radiating sound in a forward direction and a second speaker provided with a conical reflector, arranged on a side of the television set and at a position where a sound radiated position is different in height, and depth from the first speaker, for radiating and diffusing the sound to the front of the television set.

According to the first and second inventions, the first speaker radiates forward direction, and the second speaker radiates sound in the side direction which is then reflected in the forward direction. The second speaker is arranged at the position which is different in height and depth from the first speaker. Accordingly, in, for example, a case where the same audio signal is input to the first speaker and the second speaker and is heard from the front of the television set, two audios having a time difference from each other enter ears of a user. Thus, it is made possible to hear the television audios having a cubic sound feeling. In this connection, in the first invention, the acoustic waveguide is mounted to the first speaker, whereby the sound radiating mouth of the acoustic waveguide can be designed to be relatively slim. Accordingly, this becomes useful in a case where there is less in a space for arranging the first speaker whose aperture or caliber is relatively large, within the television set and in a case where an outer appearance of the television set has to be designed compact.

According to a third invention, there is provided a speaker system for a television set, which is characterized by comprising:

a first speaker arranged within said television set;

an acoustic waveguide for guiding sound from the first speaker, to a forward direction of the television set and a second speaker provided with a reflector to radiate on a side of said television set the sound in the forward direction of said television set, and of the diaphragm, to which said reflector does not face, to the side of the television.

According to a fourth invention, there is provided a speaker system for a television set, which is characterized by comprising:

a first speaker provided on a forward face of said television set, for radiating a sound in a forward direction; and a second speaker provided with a reflector on a side of said television set to radiate the sound in the forward direction of said television set, and to the side of the television set.

According to the third and fourth inventions, the first speaker which is used to radiate the sound in the forward direction, and the second speaker for radiating the sound in the side direction which is perpendicular to the sound radiated direction are provided, and the reflector is provided so as to face to the one-side face of the second speaker, to radiate the sound in the forward direction. The sound from the diaphragm of the second speaker is radiated in the side direction. Accordingly, in a case where the same audio signal is inputted to the first speaker and the second speaker and is attended or interested on the front side of the television set, three sounds having a time difference from each other enter the ears of the user. Thus, it is made possible to hear the television sounds having an expanding feeling. In this connection, in the third invention, the acoustic waveguide is mounted to the first speaker, whereby the sound radiating mouth of the acoustic waveguide can be designed to be relatively slim. Accordingly, this becomes useful in a case where there is less in a space for arranging the first speaker whose aperture or caliber is relatively large, within the television set and in a case where an outer appearance of the television set has to be designed compact.

According to a fifth invention, there is provided a speaker system for a television set, which is characterized by comprising:

a first speaker arranged within said television set;

an acoustic waveguide for guiding a sound from the first speaker in a forward direction of said television set, and a second speaker provided with a reflector on a side of the television set and at a position different in height, and depth from the first speaker and positioned so as to face to a forward direction of the speaker, for radiating the sound in a forward direction of said television set, while radiating the sound, to the side of said television.

According to a sixth invention, there is provided a speaker system for a television set, which is characterized by comprising:

a first speaker provided on a front face of the television set, for radiating a sound in a front direction; and a second speaker provided with a reflector on a side of the television set and at a position different in height, and depth from the first speaker and positioned so as face a forward direction of the speaker, for radiating the sound forward direction of said television set and to which said reflector does not face, to the side of said television set.

According to the fifth and sixth inventions, the first speaker which is used to radiate the sound to the forward direction, and the second speaker for radiating the sound in the side direction are provided, and the second speaker is arranged at the position which is different in height, and depth from the first speaker. Furthermore, the reflector is provided so as to face the second speaker, to radiate the sound in the front direction. The sound from the second speaker is also radiated to the side direction. Accordingly, for example, in a case where the same audio signal is inputted to the first speaker and the second speaker and is heard from the front of the television set, three sounds having a time difference from each other enter the ears of the user. Thus, it is made possible to hear the television sounds having a cubic sound feeling in addition to an expanding feeling. In this connection, in the fifth invention, the acoustic waveguide is mounted to the first speaker, whereby the sound radiating mouth of the acoustic waveguide can be designed to be relatively slim. Accordingly, this is useful in a case where there is less in a space for arranging the first speaker whose aperture or caliber is relatively large, within the television set and in a case where an outer appearance of the television set has to be designed compact.

According to a seventh invention, there is provided a speaker system for a television set, which is characterized by comprising:

a first left-hand speaker arranged within the television set;

a first right-hand speaker arranged within said television set;

a first acoustic waveguide for guiding sound from the first left-hand speaker in a forward direction of the television set a second acoustic waveguide for guiding sound from the first right-hand speaker, in a forward direction of the television set a second left-hand speaker provided with a conical reflector, arranged on a left-hand side of the television set at a position different in height, and depth from the first left-hand speaker, for radiating and diffusing the sound to the left-hand side, and to radiate the sound in a forward direction of the television set; and a second right-hand speaker provided with a conical reflector, arranged on a right-hand side of the television set at a position different in height and depth the first right-hand speaker, for radiating and diffusing the sound to the said right-hand side, and to radiate the sound in a forward direction of the television set.

According to an eighth invention, there is provided a speaker system for a television set, which is characterized by comprising:

a first left-hand speaker provided on a front face of the television set, for radiating a sound in a forward direction;

a first right-hand speaker provided on a front face of said television set, for radiating a sound in a forward direction;

a second left-hand speaker provided with a conical reflector arranged on a left-hand side of said television set at a position different in vertical direction, and depth from the first left-hand speaker, for radiating and diffusing the sound to the left-hand side, and to radiate the sound in a forward direction of said television set; and a second right-hand speaker provided with a conical reflector, arranged on a right-hand side of said television set at a position different in height direction, and in backward and forward, and depth from radiated position of said second right-hand speaker, for radiating and diffusing the sound to the right-hand side, and to radiate the sound in a forward direction of said television set.

According to the seventh and eighth inventions, the first left- and right-hand speakers to radiate the sound in the forward direction, and the second left- and right-hand speakers radiate sound in the two side directions which also reflected in the forward direction are provided, and the second speakers are arranged respectively at the positions which are different in height and depth from the respective first speakers. Accordingly, for example, in a case where the same left-hand audio signal is inputted to the first left speaker and the second left speaker, the same right-hand audio signal is inputted to the first right second speaker and the second right speaker, and these audio signals are heard from the front of the television set, two sounds which are superior in separation performance and which have a time difference from each other enter the ears of the user, regarding each of the left- and right-hand channels. Thus, it is possible to hear the television sounds which are stereophonic and which have an expanding feeling. In this connection, in the seventh invention, the acoustic waveguide is mounted to the first and second speakers, whereby the sound radiating mouth of the acoustic waveguide can be designed to be relatively slim. Accordingly, this becomes useful in a case where there is less in a space for arranging the first and second speakers whose apertures or calibers are relatively large, within the television set and in a case where an outer appearance of the television set has to be designed compact.

According to a ninth invention, there is provided a speaker system for a television set, which is characterized by comprising:

a first left-hand speaker arranged within the television set;

a first right-hand speaker arranged within the television set;

a first acoustic waveguide for guiding sound from the first left-hand speaker, to a forward direction of the television set, a second acoustic waveguide for guiding sound from the first right-hand speaker, to the forward direction of the television set, a second left-hand speaker provided with a reflector on the left-hand side of the television set, for radiating a sound in a forward direction of the television set, and, to the left-hand side of the television set and a second right-hand speaker provided with a reflector on a right-hand side of the television set, for radiating sound in a forward direction of said television set, and, to the right-hand side of the television set.

According to a tenth invention, there is provided a speaker system for a television set, which is characterized by comprising:

a first left-hand speaker provided on a front face of the television set, for radiating a sound in a forward direction;

a first right-hand speaker provided on the front face of the television set, for radiating a sound in a forward direction;

a second left-hand speaker provided with a reflector on a left-hand side of the television set for radiating sound in a forward direction of the television set, and, to the left-hand side of the television set and a second right-hand speaker provided with a reflector on a right-hand side of the television set, for radiating sound in a forward direction of the television set, and, to the right-hand side of the television set.

According to the ninth and tenth inventions, the first left- and right-hand speakers radiate front sound in the forward direction, and the second left- and right-hand speakers radiate sound to the side which is reflected, to radiate the sound in a forward direction of the television set. Accordingly, for example, in a case where the same left-hand audio signal is input to and second left speaker and the same right-hand audio signal is inputted to the improvements to stereophonic sound reproduction made of the television set, three sounds which are superior in separation performance and which have a time difference from each other enter the ears of the user regarding each of left- and right-hand channels. Thus, it is made possible to hear the television sounds which have an expanding feeling. In this connection, in the ninth invention, the acoustic waveguides are mounted respectively to the first speakers, whereby the sound radiating mouths of the respective acoustic waveguides can be designed to be relatively slim. Accordingly, this becomes useful in a case where there is less in a space for arranging the first speakers within the television set, whose apertures or calibers are relatively large and in a case where an outer appearance of the television set has to be designed compact.

According to an eleventh invention, there is provided a speaker system for a television set, which is characterized by comprising:

a first left-hand speaker arranged within the television set;

a first right-hand speaker arranged within said television set;

a first acoustic waveguide for guiding sound from the first left-hand speaker, in a forward direction of the television set a second acoustic waveguide for guiding sound from the first right-hand speaker, in a forward direction of second television set a second left-hand speaker provided with a reflector arranged on a left-hand side of the television set at a position different in height and depth from the first left-hand speaker, for radiating sound in a forward direction of the television set, and a second right-hand speaker provided with a reflector arranged on a right-hand side of the television set at a position height and depth from right-hand speaker, for radiating the sound in a forward direction of the television set, and to the right-hand side of said television set.

According to a twelfth invention, there is provided a speaker system for a television set, which is characterized by comprising:

a first left-hand speaker provided on a front face of said television set, for radiating a sound in a forward direction;

a first right-hand speaker provided on the front face of said television set, for radiating a sound in a forward direction;

a second left-hand speaker provided with a reflector arranged on a left-hand side of said television set at a position different in height and depth from the first left-hand speaker, for radiating sound in a forward direction of the television set, and to the left-hand side of said television set and a second right-hand speaker provided with a reflector arranged on a right-hand side of the television set and at a position different in height and depth from the first right-hand speaker, for radiating the sound in a forward direction of the television set, and to the right-hand side of said television set.

According to the eleventh and twelfth inventions, the first left and right speakers radiate sound in a forward direction, and second left and right speakers radiate the sound to the side direction which is also reflected in a forward direction. The second left and right speakers are arranged at the positions different in height and depth from respective first left and right speakers. Accordingly, for example, in a case where the same left-hand audio signal is input to the first and second left speakers, and the same right-hand audio signal is input to the first and second right speakers which are heard from on the front of the television set, three sounds which are superior in separation performance and which have a time difference from each other enter the ears of the user regarding each of left- and right-hand channels. Thus, it is possible to hear the television sounds which have a cubic sound feeling in addition to an expanding feeling. In this connection, in the eleventh invention, the acoustic waveguides are mounted respectively to the first left and right speakers, whereby the sound radiated mouths of the acoustic waveguides can be designed to be relatively slim. Accordingly, this becomes useful in a case where there is less in a space for arranging the first and second speakers within the television set, whose apertures or calibers are relatively large and in a case where an outer appearance of the television set has to be designed compact.

DETAILED DESCRIPTION OF THE PREFERRED EMBODIMENTS

Various embodiments will be described with reference to the drawings.

Figure 1:
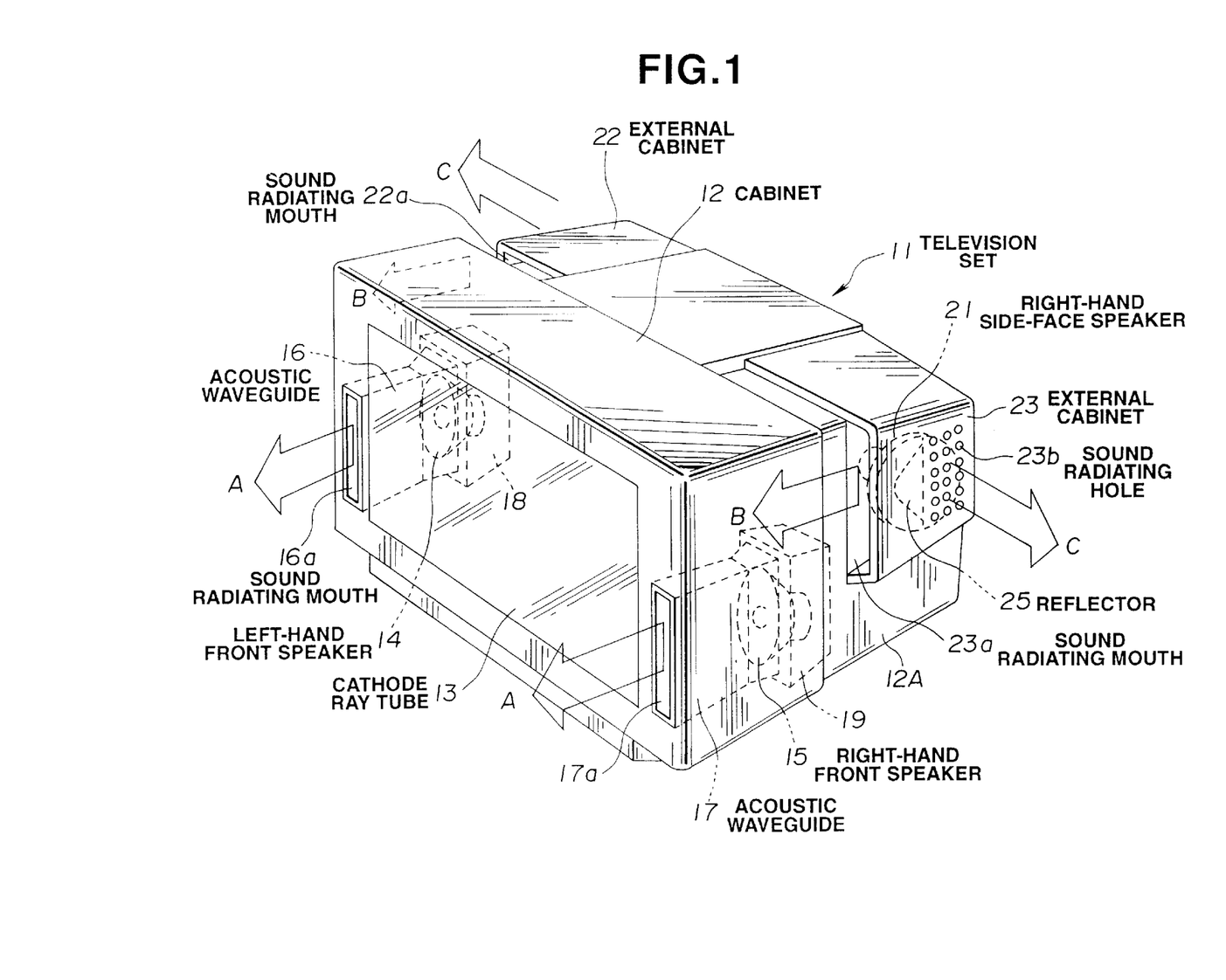
FIG. 1 is a perspective view showing a speaker system for a television set, according to a first embodiment of the invention.
Figure 2:
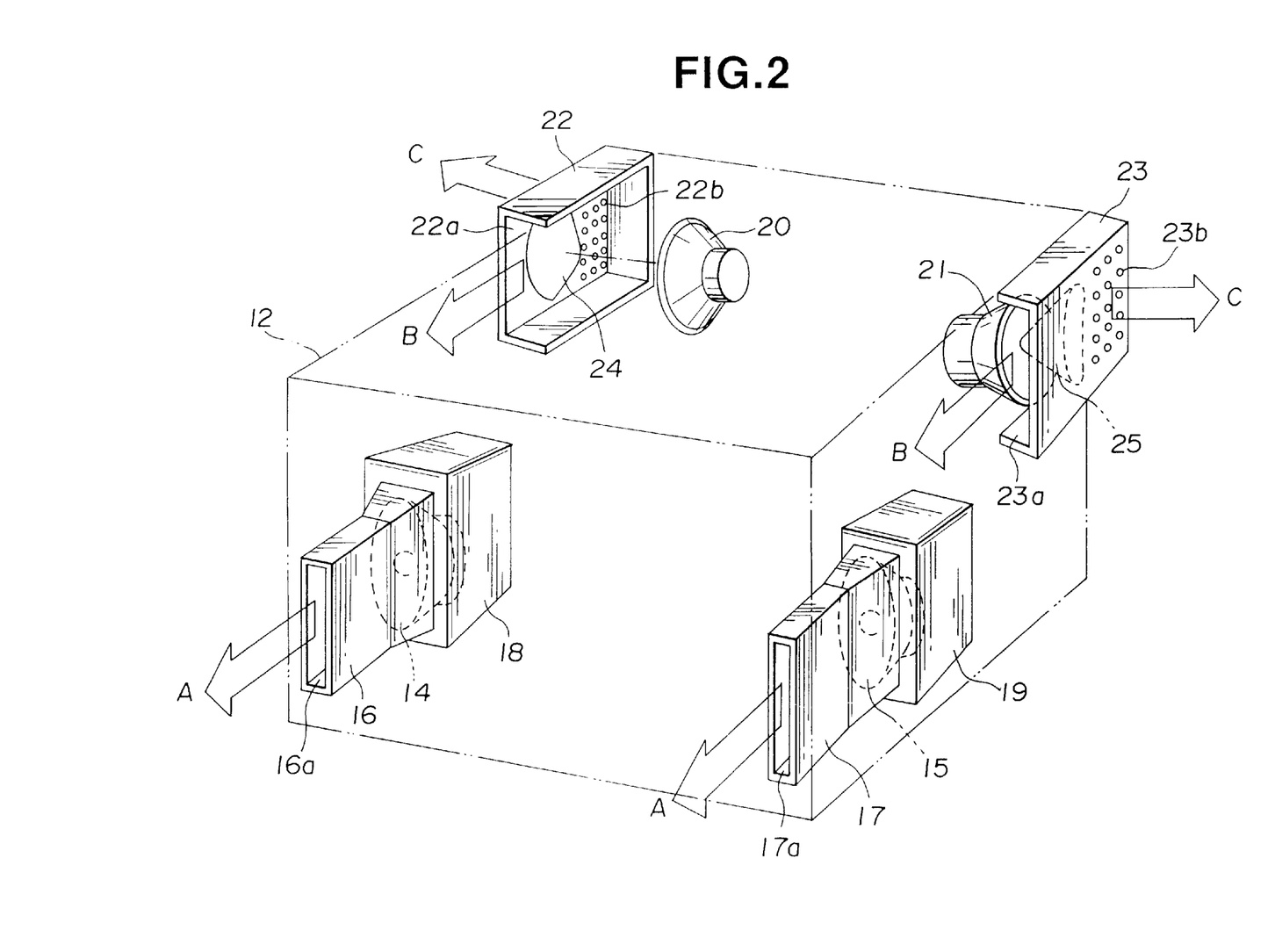
FIG. 2 is a perspective view showing an arrangement of the speaker system in FIG. 1 with the arrangement modeled.

FIG. 1 is a perspective view showing a speaker system for a television set, according to a first embodiment of the invention, while FIG. 2 is a perspective view showing a modeled arrangement of the speaker system in FIG. 1. In this connection, in FIG. 2, in order to make understanding easy, the arrangement relation between an external cabinet 22 and a speaker 20 is under a state in which the speaker 20 draws apart from the external cabinet 22.

In FIG. 1, the reference numeral 11 is a television set. A cathode ray tube 13 is arranged within a cabinet 12 of the television set 11. Left- and right-hand front speakers 14 and 15 are arranged respectively at left- and right-hand positions on both sides of the cathode ray tube 13. Acoustic waveguides 16 and 17 are mounted respectively to front faces of the left- and right-hand respective front speakers 14 and 15. The left- and right-hand acoustic waveguides 16 and 17 have respective sound radiating mouths 16a and 17a thereof which are arranged on a front panel (a forward frame) of the cabinet 12. In this connection, the acoustic waveguides 16 and 17 are mounted respectively to front faces of the speakers 14 and 15 which are relatively large in aperture or caliber under a form in depth and under a lengthwise form. The sound radiating mouths 16a and 17a also have lengthwise slim forms. The sound radiating mouths 16a and 17a are so arranged as to be connected respectively to unshown sound radiating holes which are provided respectively at left- and right-hand positions of the front panel. Accordingly, the arrangement is such that the left- and right-hand sounds from the respective left- and right-hand front speakers 14 and 15 are guided in a forward direction by the left- and right-hand acoustic waveguides 16 and 17 and are radiated in a forwardly front direction of the television set 11 through the sound radiating mouths 16a and 17a.

In connection with the above, rear cabinets 18 and 19 for shielding the sound which is emitted from rears of the respective speakers are mounted respectively to rears of the left- and right-hand speakers 14 and 15 in order that the sound which is radiated from the rear of each speakers is not radiated to the outside through an unshown ventilation hole from a rear 12A of the cabinet 12, and the sound is not mixed with the sound which is radiated to the front of the television set, so as not to distort sound to the user.

Further, in the present embodiment, the left- and right-hand side speakers 20 and 21 (refer to FIG. 2) are arranged respectively on left- and right-hand sides of the rear 12A of the cabinet 12 of the television set 11 such that the speakers face their respective sides. A pair of reflectors 24 and 25 each having a generally semi-conical form are arranged so as to face the respective left- and right-hand side speakers 20 and 21. Moreover, the external cabinets 22 and 23 for holding respectively the reflectors 24 and 25 to an inner face thereof are mounted respectively to left- and right-hand outward faces of the rear 12A of the cabinet 12. The external cabinets 22 and 23 are arranged substantially into a box-like form. The external cabinets 22 and 23 are provided respectively with sound radiating mouths 22a and 23a for radiating the sound in a forward direction of the television set 11 and are provided respectively with the aforesaid reflectors 24 and 25 for radiating the sound in a forward direction of the television set 11 by facing the diaphragms of the respective side speakers 20 and 21. On one hand, radiating holes 22b and 23b are provided for radiating the radiated sound from the left- and right-hand sides of the television set 11.

As shown in FIG. 2, the left- and right-hand side speakers 20 and 21 are arranged respectively on both the sides of the television set. However, the arrangement is such that their respective sound radiating positions are arranged respectively at positions which are different in height and depth from each other with respect to the sound radiating positions of the left- and right-hand front speakers 14 and 15, as viewed from the front of the television set.

In the speaker system arranged as described above, the arrangement is such that, for example, the front speaker 14 and the side speaker 20 are connected electrically in parallel to each other, and the audio signal of the left-hand channel is supplied simultaneously to the left-hand front speaker 14 and the left-hand side speaker 20. The arrangement is such that the front speaker 15 and the side speaker 21 are connected electrically in parallel to each other, and the audio signal of the right-hand channel is supplied simultaneously to the right-hand front speaker 15 and the right-hand side speaker 21.

Accordingly, since the left- and the right-hand side speakers 20 and 21 are provided in addition to the left- and right-hand front speakers 14 and 15, left- and right-hand sound radiating parts are expanded or widened laterally. Thus, it is possible to exhibit such superior advantages that left- and right-hand separation performance is improved. Furthermore, the positional relation between the left-hand front speaker 14 and the left-hand side speaker 20, and the positional relation between the right-hand front speaker 15 and the right-hand side speaker 21 are different in from each other as viewed from the front of the television set 11. Accordingly, in a case where the user hears the sound from the front of the television set 11, in the left channel sound from the left-hand front speaker 14 and the left channel sound from the left-hand side speaker 20, the same left channel sound is generated from positions which are different in height and depth from each other. Similarly, in the right channel sound from the right-hand front speaker 15 and the right channel sound from the right-hand side-face speaker 21, the same right channel sound is generated from positions which are different in height and depth from each other. For this reason, each of the sounds from the left and right channel realize a time shift. Thus, it is possible that a cubic sound feeling and a movement feeling occur in the sound. In this manner, in the television set according to the present embodiment, a time difference (that is, a phase difference) occurs on the same sound which is radiated from the front speaker and side speaker. This is heard by the user as a thickness of sound. Thus, there are advantages that a cubic sound feeling and a movement feeling in a depth direction occur in the sound.

Further, in the present embodiment, in addition to the sound A from the front speakers 14 and 15, regarding each of the speakers including the side speakers 20 and 21, the reflectors 24 and 25 each having a generally semi-conical form are provided for radiating a sound B forwardly of the television set 11 by facing to the forward direction of the one side of the speaker diaphragm, while a radiating sound C from the other one side of the speaker diaphragm to which the reflectors 24 and 25 do not face is radiated to the outside of the side of the television set through the sound radiating holes 22b and 23b in the external cabinets 22 and 23 as it is. Accordingly, regarding the left and the right, the same signal is radiated from three sound radiating parts. Thus, it is possible to improve the separation performance of the left- and right-hand sounds, and it is possible to cause the expanding feeling to occur in the sound in addition to the cubic sound feeling and the movement feeling. In this connection, there are advantages that the radiating sound C which is radiated from both the sides of the television set 11 impinges against a wall face within a room and is reflected thereby so that the expanding feeling and the stereophonic feeling occur in the user.

Figure 3A:
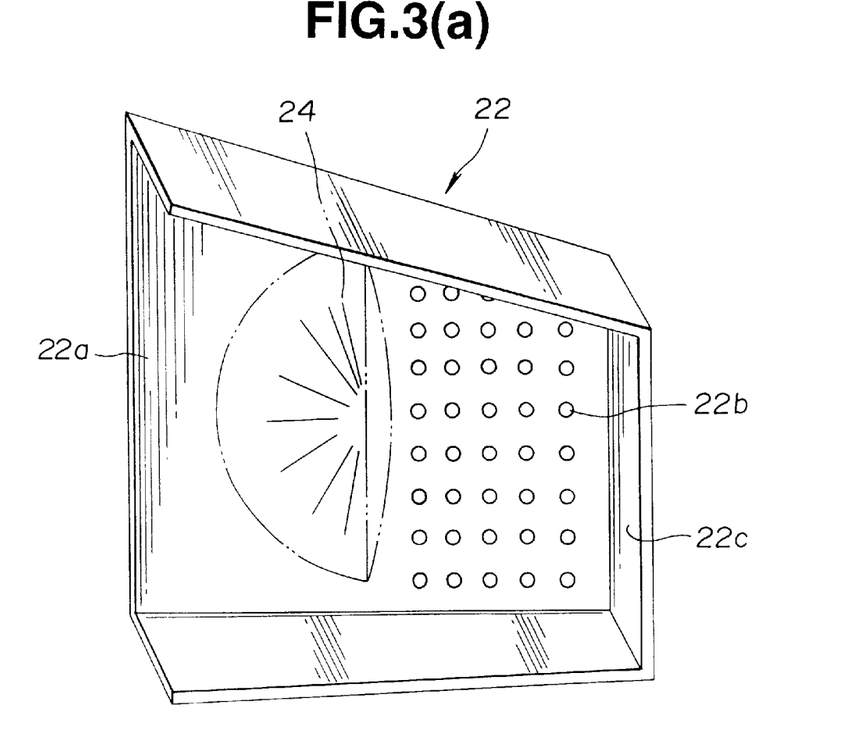
FIG. 3(a) is a perspective view showing an arrangement example of an external cabinet in FIG. 1.
Figure 3B:
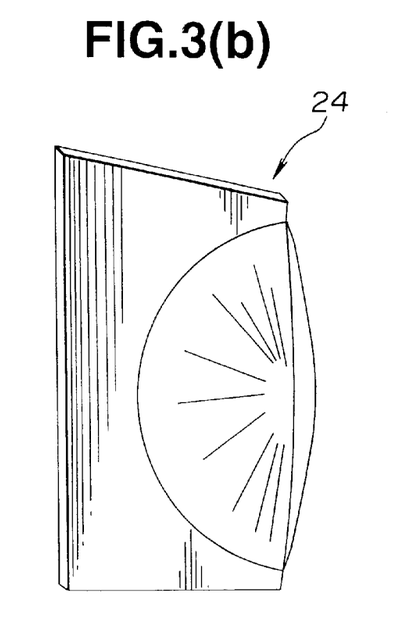
FIG. 3(b) is a perspective view showing a reflector which is mounted to an inner face of the external cabinet in FIG. 3(a)

FIG. 3(*a*) shows an arrangement example of the external cabinet 22. In this connection, the other external cabinet 23 has also the similar form or shape. The external cabinet 22 shown in FIG. 3(*a*) is formed to have such an outer appearance form thereof that an area of a portion of the sound radiating mouth 22a is large, and an area of the sound shielding part 22c which is opposite in face thereto is small. Moreover, the reflector 24 having substantially a semi-conical shape as shown in FIG. 3(*b*) is anchored by anchoring means (adhesives, a latching screw or the like) at a position on an inner face of the external cabinet which is scheduled such that the side speaker 20 (refer to FIG. 2) confronts thereagainst. A plurality of sound radiating holes 22b open respectively at the positions on the inner face of the external cabinet which is scheduled such that the side speaker 20 (refer to FIG. 2) confronts thereagainst so as to pass through to the outside. In this connection, when the external cabinet 22 in FIG. 3(*a*) is mold-formed by synthetic resin or the like, the reflector 24 having substantially the semi-conical shape can integrally be formed by mold forming or shaping simultaneously with the external cabinet 22.

Figure 4:
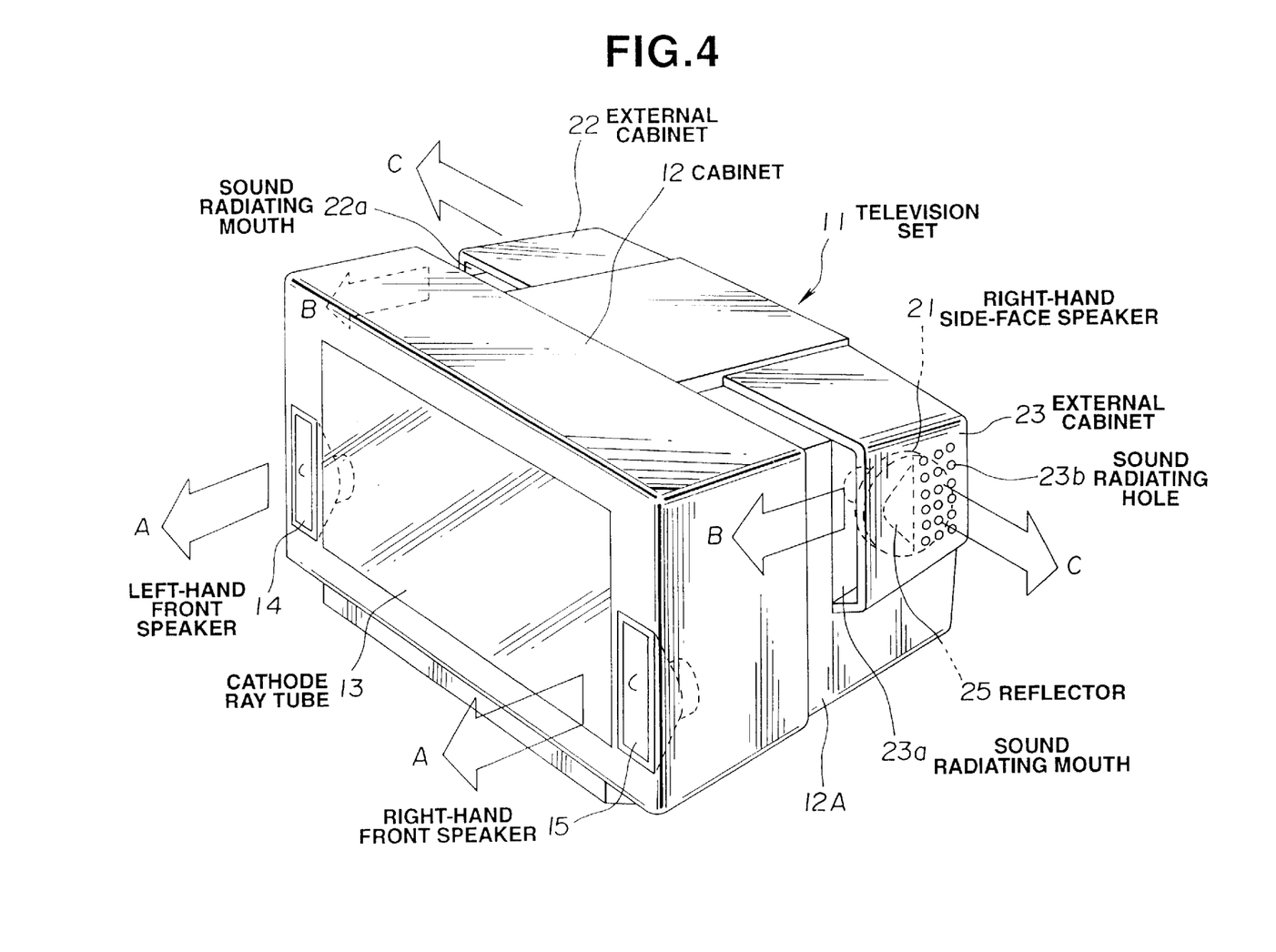
FIG. 4 is a perspective view showing a speaker system for a television set, according to a second embodiment of the invention.
Figure 5:
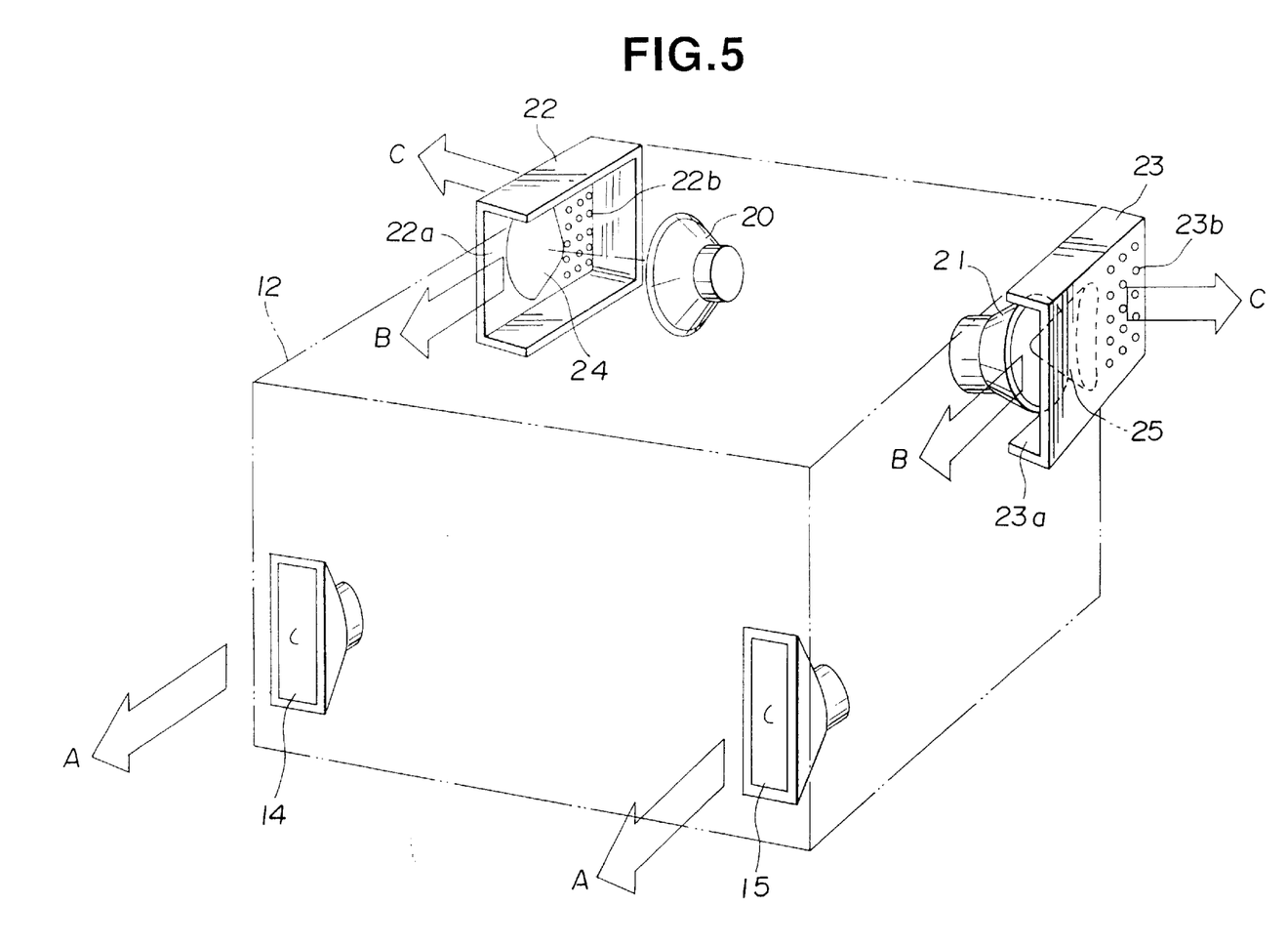
FIG. 5 is a perspective view showing an arrangement of the speaker system in FIG. 4 with the arrangement modeled.

FIG. 4 is a perspective view showing a speaker system for a television set, according to a second embodiment of the invention. FIG. 5 is a perspective view showing an arrangement in which the speaker system in FIG. 4 is modeled. In this connection, also in FIG. 5, the arrangement relation between the external cabinet 22 and the speaker 20 is shown under a state in which the speaker 20 is drawn apart with respect to the external cabinet 22.

In the embodiment shown in FIG. 4, a point which is different from the embodiment shown in FIGS. 1 and 2 is such an arrangement of the front speakers 14 and 15 are directly mounted to an unshown opening portion which is formed in the front panel of the television set 11 without the fact that the acoustic waveguides 16 and 17 are mounted respectively to the forward faces of the respective diaphragms of the front speakers 14 and 15. In this connection, the rear cabinets 18 and 19 of the front speakers 14 and 15 may be mounted. In the present example, however, an arrangement in which the rear cabinets 18 and 19 are removed is shown. The other arrangement is similar to that of the embodiment shown in FIGS. 1 and 2.

According to the embodiment shown in FIG. 4, it is possible to raise a sound pressure level in a forward direction of the television set due to these front speakers 14 and 15 since there are no acoustic waveguides, as compared with the embodiment illustrated in FIGS. 1 and 2. Moreover, similarly to the embodiment shown in FIGS. 1 and 2, the sound from the side speakers 20 and 21 is reflected by the reflectors 24 and 25 each of which has substantially the semi-conical form and is released or emitted to the front direction of the television set, while being emitted to each of the left- and right-hand side directions from the sound radiating holes 22b and 23b. Accordingly, it is possible to produce a thickness feeling and a cubic sound feeling of the sound.

Figure 6:
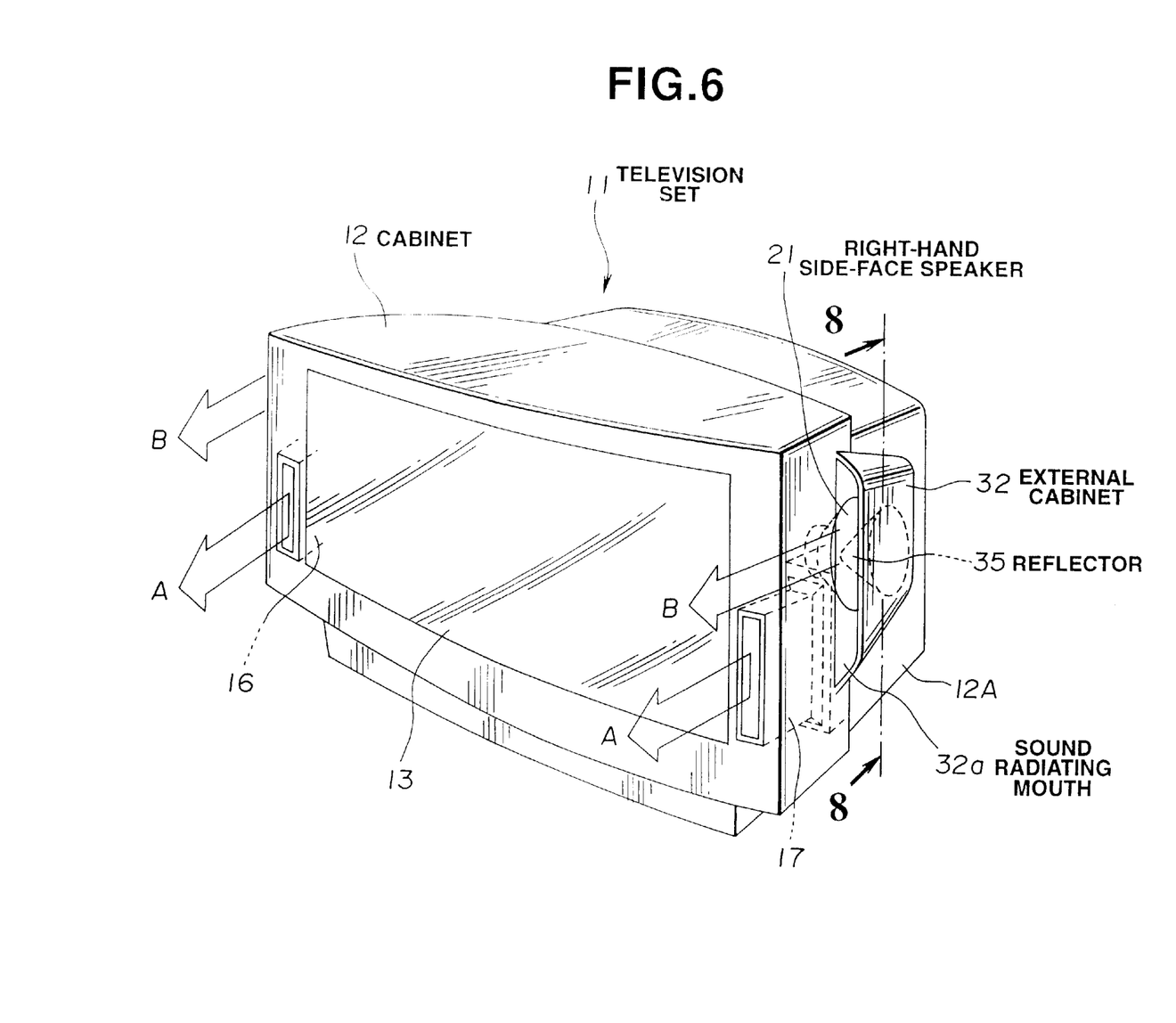
FIG. 6 is a perspective view showing a speaker system for a television set, according to a third embodiment of the invention.
Figure 7:
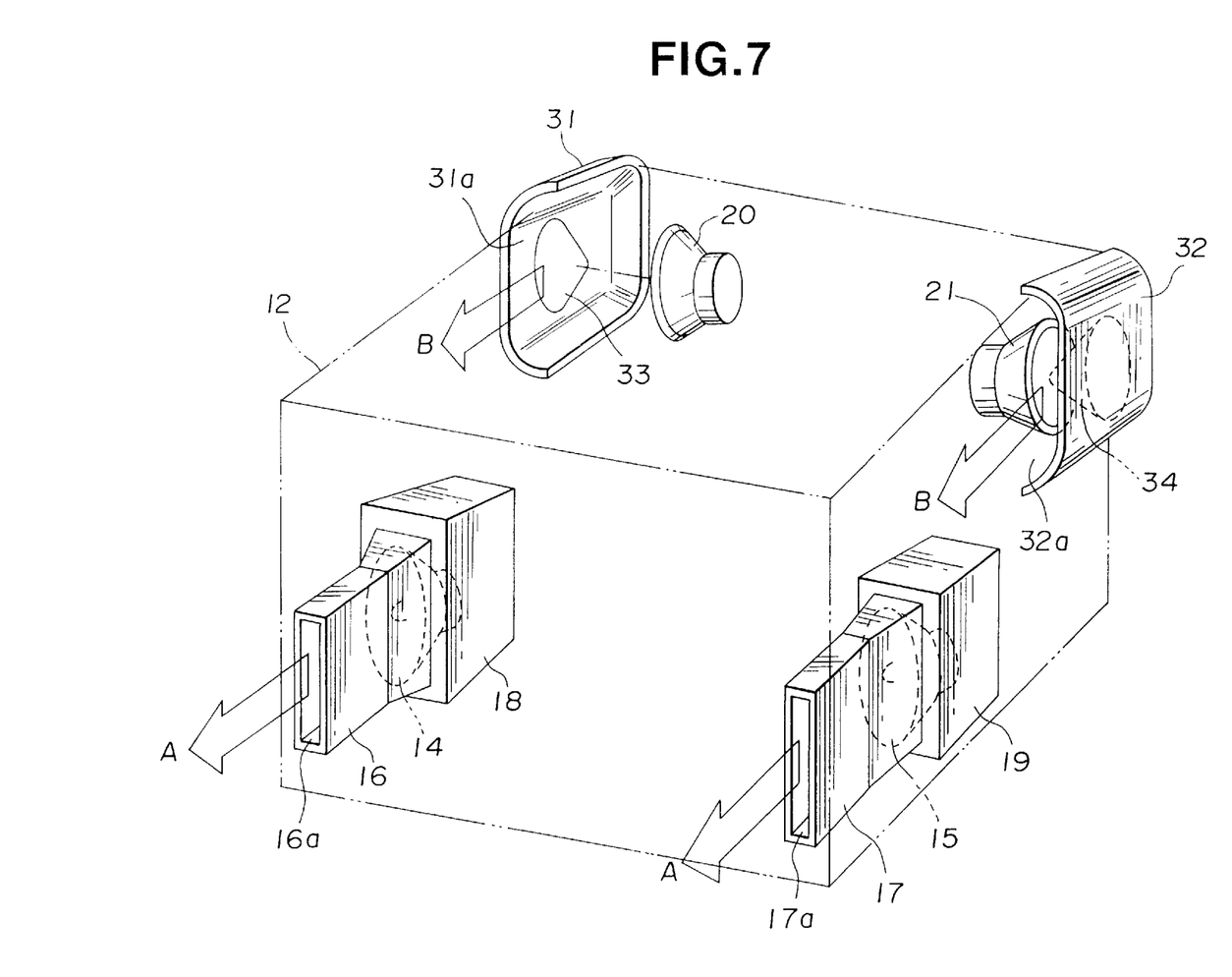
FIG. 7 is a perspective view showing an arrangement of the speaker system in FIG. 6 with the arrangement modeled.

FIG. 6 is a perspective view showing a speaker system for a television set, according to a third embodiment of the invention. FIG. 7 is a perspective view showing an arrangement in which the speaker system shown in FIG. 6 is modeled. In this connection, also in FIG. 7, the arrangement relation between an external cabinet 31 and the speaker 20 is shown under a state in which the speaker 20 is drawn apart with respect to the external cabinet 31.

In FIGS. 6 and 7, a point which is different from the embodiment shown in FIG. 1 is that a sound radiating hole is not formed in the external cabinets 31 and 32 which face the left- and right-hand respective side speakers 20 and 21, and reflectors 33 and 34 each of which has substantially the conical form are provided respectively on the inner faces of the respective external cabinets 31 and 32 so as to confront against the whole of the respective side speakers 20 and 21 corresponding thereto.

In FIG. 6, the cathode ray tube 13 is arranged within the cabinet 12. At left- and right-hand positions on both sides thereof, left- and right-hand front speakers 14 and 15 (refer to FIG. 7) which are provided respectively with the acoustic waveguides 16 and 17 are arranged respectively. The sound radiating mouths 16a and 17a of the respective left- and right-hand acoustic waveguides 16 and 17 are arranged on the front panel (forward frame) of the cabinet 12. The sound radiating mouths 16a and 17a are connected respectively to unshown sound radiating holes which are provided respectively at left- and right-hand positions on the front panel. In this connection, the rear cabinets 18 and 19 (refer to FIG. 7) are mounted respectively on rears of the respective left- and right-hand front speakers 14 and 15.

Furthermore, in the present embodiment, on respective left- and right-hand sides of the rear 12A of the cabinet 12 of the television set 11, left- and right-hand side speakers 20 and 21 (refer to FIG. 7) are arranged against respective sides thereof. The reflectors 33 and 34 each of which has substantially the conical shape are arranged so as to face to the forward direction of the respective left- and right-hand side speakers 20 and 21. Moreover, the external cabinets 31 and 32 for holding the reflectors 33 and 34 against inner faces thereof are mounted respectively to left- and right-hand outward faces of the rear 12A of the cabinet 12. The external cabinets 31 and 32 are formed substantially into a box-like shape, and are provided with sound radiating mouths 31a and 32a for radiating the sound in a forward direction of the television set 11.

Figure 8:
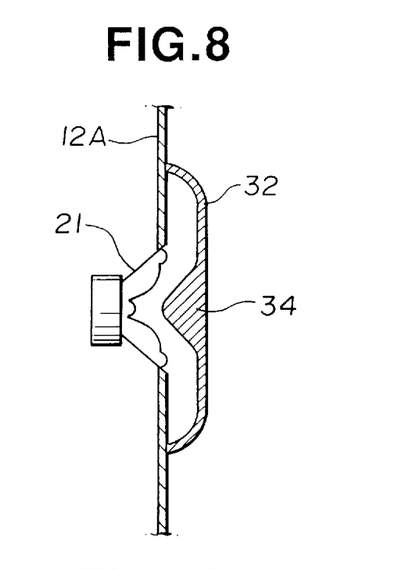
FIG. 8 is a longitudinal cross-sectional view taken along a line 8—8 in FIG. 6.

FIG. 8 shows a longitudinal cross-sectional view taken along a line 8—8 in FIG. 6. The side speaker 21 is mounted to an opening portion which is provided in the rear cabinet 12A. The external cabinet 32 is anchored onto the rear cabinet 12A such that the reflector 34 comes up at a position which is faced against the side speaker 21.

The left- and right-hand side speakers 20 and 21 are arranged respectively on both sides of the cabinet 12 of the television set, as shown in FIG. 7. However, their sound radiating positions are arranged respectively at positions which are different in height and depth of the left- and right-hand front speakers 14 and 15, as viewed from the front of the television set.

In the speaker system in FIGS. 6 and 7, arranged as described above, the audio signal of the left-hand channel, for example, is so electrically wired as to be simultaneously supplied to the left-hand front speaker 14 and the left-hand side speaker 20. The audio signal of the right-hand channel is so electrically wired as to be simultaneously supplied to the right-hand front speaker 15 and the right-hand side speaker 21. Accordingly, since the left- and right-hand side speakers 20 and 21 are provided in addition to the left- and right-hand front speakers 14 and 15, it is possible to exhibit advantages which are superior in separation performance of left- and right-hand channel audios. Further, the arrangement positional relation between the left-hand front speaker 14 and the left-hand side speaker 20, and the arrangement positional relation between the right-hand front speaker 15 and the right-hand side speaker 21 are different from each other in height and depth as viewed from the front of the television set 11. Accordingly, in a case where the user hears the sound on the front of the television set 11, the same left-hand channel audio is emitted from positions which are different in height and depth from each other, and enters the ears, regarding the left-hand channel sound from the left-hand front speaker 14 and the left-hand channel sound from the left-hand side speaker 20. Similarly, regarding the right-hand channel sound from the right-hand front speaker 15 and the right-hand channel sound from the right-hand side speaker 21, the same right-hand channel sound is emitted from positions which are different in height and depth from each other, and enters the ears. For this reason, regarding each of the sounds of the left- and right-hand channel sound, sounds in which a time shift occurs in the same sound simultaneously enter the ears. Thus, it is possible to cause the cubic sound feeling and the movement feeling to occur in the sound. In this manner, in the television set according to the embodiment, a time difference (that is, a phase difference) occurs regarding the same sound which is emitted from the front speaker and the side speaker. This is heard by the user as becoming a sound thickness, and is advantageous in that the cubic sound feeling and the movement feeling in the depth direction are caused to occur in the sound.

In the embodiment illustrated in FIGS. 6 and 7, in addition to the sound A from the front speakers 14 and 15, the sound B from the side speakers 20 and 21 which are located respectively at positions which are different in depth direction (and height direction) from the front speakers 14 and 15 are superimposed thereupon and are heard. In this connection, in the present embodiment, differentiated from the embodiment shown in FIGS. 1 and 2, there is no sound which is radiated from the side speakers 20 and 21 to left- and right-hand side directions of the television set 11. Correspondingly thereto, a sound pressure level which is radiated in the front direction of the television set 11 increases at each of the reflectors 34 and 35. Accordingly, sound which shifts in time due to the same signal from the side speakers 20 and 21 is added with respect to the sound in the front direction from the front speakers 14 and 15. Furthermore, the addition is executed by a larger sound pressure level as compared with a case of the embodiment shown in FIGS. 1 and 2. It is possible to output the sound in which the cubic sound feeling in the depth direction is emphasized.

Figure 9:
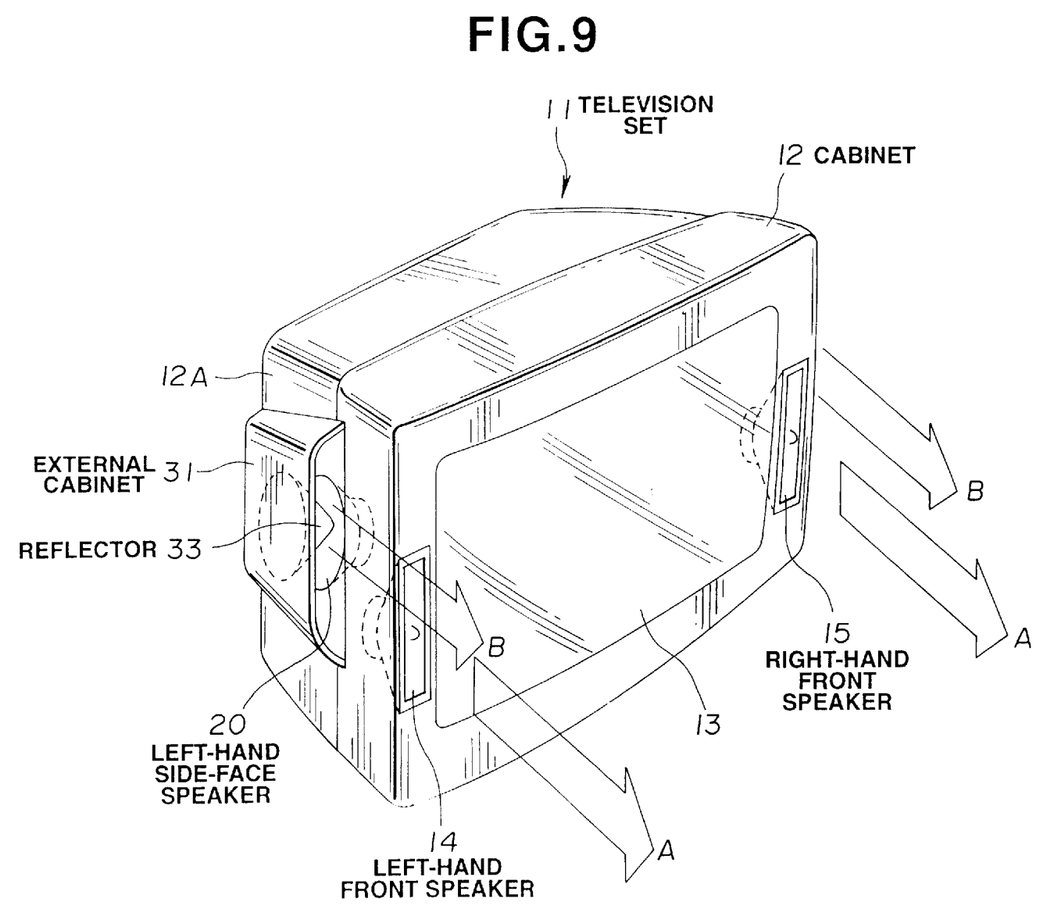
FIG. 9 is a perspective view showing a speaker system for a television set, according to a fourth embodiment of the invention.
Figure 10:
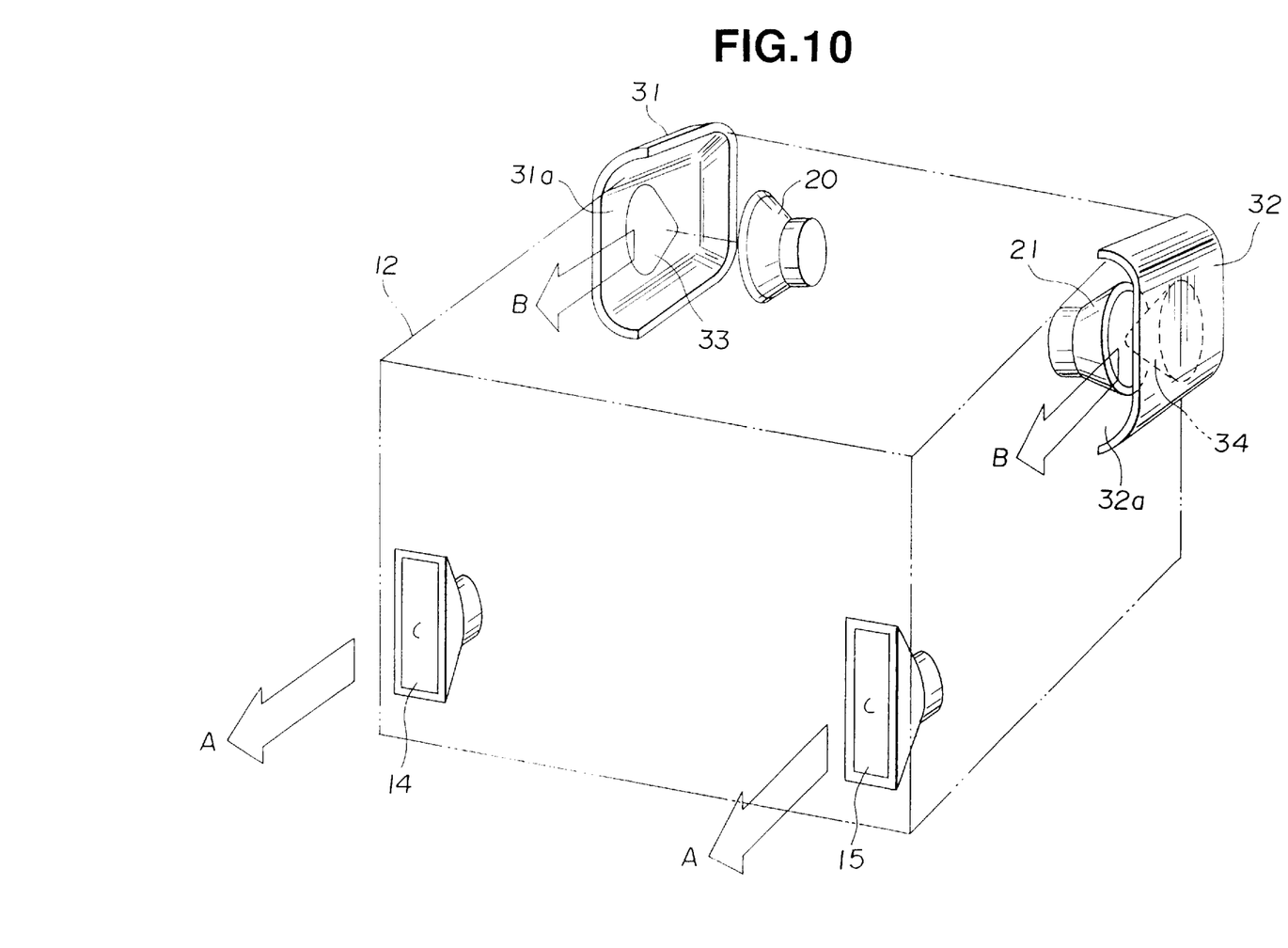
FIG. 10 is a perspective view showing an arrangement of the speaker system in FIG. 9 with the arrangement modeled.

FIG. 9 is a perspective view showing a speaker system for a television set, according to a fourth embodiment of the invention. FIG. 10 is a perspective view showing an arrangement in which the speaker system shown in FIG. 9 is modeled. In this connection, also in FIG. 10, the arrangement relation between the external cabinet 31 and the speaker 20 is shown under a state in which the speaker 20 is drawn apart with respect to the external cabinet 31.

In the embodiment shown in FIG. 9, a point which is different from the embodiment shown in FIGS. 6 and 7 is that the front speakers 14 and 15 are directly mounted to an opening portion which is provided in the front panel of the television set 11 without acoustic waveguides 16 and 17. In this connection, the rear cabinets 18 and 19 of the respective front speakers 14 and 15 may be mounted. In the present example, however, an arrangement in which the rear cabinets 18 and 19 are removed or unfastened is shown. The other arrangement is similar to the embodiment shown in FIGS. 6 and 7.

According to the embodiment shown in FIG. 9, it is possible to raise the sound pressure level in the front direction of the television set due to these front speakers 14 and 15, because there are no acoustic waveguides at the forward faces of the diaphragm of the front speakers 14 and 15, as compared with the embodiment illustrated in FIGS. 6 and 7. Moreover, it is possible to raise the sound pressure level in the front direction of the television set due to the front speakers 14 and 15, as compared with the embodiment illustrated in FIGS. 1 and 2. Further, the sound from the side speakers 20 and 21 is reflected by the reflectors 34 and 35 each of which has substantially the conical form, whereby it is possible to raise the sound pressure level in the front direction of the television set, and it is possible to produce the thickness feeling and the cubic sound feeling of the sound, similarly to the other embodiments.

In connection with the above, in the embodiments of the invention which have been described above, a case has been described in which the left-hand front speaker 14 and the side speaker 20 are connected in parallel to each other, the left channel signal from the same left channel amplifier is supplied to both the speakers 14 and 20, and the right-hand front speaker 15 and the side speaker 21 are connected in parallel to each other, and the right channel signal from the same right channel amplifier is supplied to both the speakers 15 and 21. However, the arrangement may be such that respective speakers including the front speaker 14 and the side speaker 20 are driven respectively by separate amplifiers, respective speakers including the front speaker 15 and the side speaker 21 are driven respectively by separate amplifiers, and outputs from the respective amplifiers can be regulated. If doing so, or with such arrangement, it is possible to change the sound pressure levels of the respective speakers individually so that attention can respectively be executed.

Moreover, in the embodiment illustrated in FIGS. 1 and 4, description has been made such that the sound is radiated in the front direction of the television set by the reflectors which are arranged in front of the side speakers 20 and 21. However, the arrangement may be such that the directions of the sound radiating mouths 22a and 23a of the external cabinets 22 and 23 are changed, or the orientation and the shape of the reflectors 24 and 25 are changed, whereby the sound radiating direction is made to a direction different from the front direction, for example, in an oblique forward (an oblique outward) direction. In this manner, the radiating direction of the sound is partially changed whereby it is possible to attend the sound in which balance among the sound pressure levels of a plurality of sounds which enter the ears of the user is changed. Further, similarity is applied to the external cabinets 31 and 32 in the embodiment illustrated in FIGS. 6 and 9.

As described above, according to the present invention, it is made possible to reproduce the stereophonic sound which is superior in stereophonic separation and which has the cubic sound feeling, the expanding feeling and the movement feeling.

In connection with the above, the present invention should not be limited only to the above-described embodiments. Various modifications can be carried into practice within a range which does not depart from the gist of the invention.

What is claimed is:

1. A speaker system in combination with a television set, said television set including a cabinet having a top plate, a bottom plate and left and right side plates and a display provided at a part surrounded by said top plate, bottom plate and left and right side plates, the bottom plate being a side of the cabinet adapted to contact a support for bearing weight of the television and the top plate being a side of the cabinet opposite the bottom plate, comprising:

a pair of first speakers each having a diaphragm, said pair of first speakers being mounted symmetrically with respect to said display within said cabinet and being for radiating sound from said diaphragms in a forward direction of said television set;

acoustic waveguides mounted within said cabinet for guiding sound radiated from said diaphragms of respective ones of said pair of first speakers to radiate sound from a front side of said television set;

a pair of second speakers each having a diaphragm, said second speakers being mounted within said cabinet at positions different in height as well as in depth from sound radiating positions of said first speakers and being for radiating sound from said diaphragms of said second speakers respectively in a leftward direction and in a rightward direction of said television set, respectively; and reflector means mounted to said left and right side plates of said cabinet and having a pair of outer cabinets each with a sound radiation opening at a part toward a front side of said television set and conical reflectors at positions opposing said diaphragms of said second speakers within said outer cabinets respectively, the reflector means being for reflecting sound from said diaphragms of said second speakers and for radiating the sound from said diaphragms of said second speakers in the forward direction of said television set through said sound radiation openings.

2. A speaker system in combination with a television set, said television set including a cabinet having a top plate, a bottom plate and left and right side plates and a display provided at a part surrounded by said top plate, bottom plate and left and right side plates, the bottom plate being a side of the cabinet adapted to contact a support for bearing weight of the television and the top plate being a side of the cabinet opposite the bottom plate, comprising:

a pair of first speakers each having a diaphragm, said pair of first speakers being mounted symmetrically with respect to said display within said cabinet, for radiating sound from said diaphragms in a forward direction of said television set;

a pair of second speakers each having a diaphragm, said second speakers being mounted within said cabinet at positions different in height as well as in depth from sound radiating positions of said first speakers, for radiating sound from said diaphragms of said second speakers respectively in a leftward direction and in a rightward direction of said television set, respectively; and reflector means mounted to said left and right side plates of said cabinet and having a pair of outer cabinets each with a sound radiation opening at a part toward a front side of said television set and conical reflectors at positions opposing said diaphragms of said second speakers within said outer cabinets respectively, the reflector means being for reflecting sound from said diaphragms of said second speakers and for radiating the sound from said diaphragms of said second speakers in the forward direction of said television set from said sound radiation openings.

3. A speaker system for a television set according to claim 1 or 2, wherein said outer cabinets have holes for radiating sound from said diaphragms of respective ones of said second speakers directly in the leftward direction and in the rightward direction to radiate sound through said radiation holes respectively in the leftward direction and in the rightward direction of said television set.

4. A speaker system for a television set according to claim 1 or claim 2, wherein each of said reflectors is semi-conical.

* * * * *